US011635210B2

(12) United States Patent
Ryon et al.

(10) Patent No.: US 11,635,210 B2
(45) Date of Patent: Apr. 25, 2023

(54) CONFORMAL AND FLEXIBLE WOVEN HEAT SHIELDS FOR GAS TURBINE ENGINE COMPONENTS

(71) Applicant: Delavan Inc., Des Moines, IA (US)

(72) Inventors: Jason Ryon, Carlisle, IA (US);
Gregory Zink, Des Moines, IA (US);
Lev Alexander Prociw, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/125,028

(22) Filed: Dec. 17, 2020

(65) Prior Publication Data

US 2022/0195930 A1 Jun. 23, 2022

(51) Int. Cl.
*F23R 3/28* (2006.01)
*F02C 7/24* (2006.01)
*F02C 7/22* (2006.01)

(52) U.S. Cl.
CPC ............... *F23R 3/283* (2013.01); *F02C 7/24* (2013.01); *F02C 7/222* (2013.01); *F05D 2240/15* (2013.01); *F05D 2240/35* (2013.01); *F05D 2260/231* (2013.01)

(58) Field of Classification Search
None
See application file for complete search history.

(56) References Cited

U.S. PATENT DOCUMENTS

| 2,540,642 A | 2/1951 | Allen et al. |
| 2,541,900 A | 2/1951 | Williams |
| 2,645,082 A | 7/1953 | Sarto |
| 2,648,951 A | 8/1953 | McDougal |

(Continued)

FOREIGN PATENT DOCUMENTS

| DE | 1064760 B | 9/1959 |
| DE | 102018214281 B3 | 8/2019 |

(Continued)

OTHER PUBLICATIONS

Extended European Search Report for EP Application No. 21192156.4, dated Feb. 1, 2022, 7 pages.

(Continued)

*Primary Examiner* — Katheryn A Malatek
*Assistant Examiner* — Alyson Joan Harrington
(74) *Attorney, Agent, or Firm* — Kinney & Lange, P.A.

(57) ABSTRACT

A heat shielded assembly includes a fuel structure of a combustor of a gas turbine engine and a woven heat shield at least partially conformally surrounding the fuel structure and spaced from an exterior of the fuel structure by a distance where it surrounds the fuel structure. The fuel structure is configured to deliver fuel to the combustor. The woven heat shield comprises a first set of strands, a second set of strands interwoven with the first set of strands, and a weave pattern comprising the first set of strands and the second set of strands. Each strand of the first set of strands extends in a first direction, each strand of the second set of strands extends in a second direction transverse to the first direction, and the first set of strands and the second set of strands are not attached where they intersect in the weave pattern.

17 Claims, 8 Drawing Sheets

(56) References Cited

U.S. PATENT DOCUMENTS

| | | | |
|---|---|---|---|
| 2,734,341 A | 2/1956 | Lovesey | |
| 2,784,553 A | 3/1957 | De et al. | |
| 2,811,676 A | 10/1957 | Smits | |
| 2,840,742 A | 6/1958 | Watters | |
| 2,847,826 A | 8/1958 | Dennis | |
| 2,864,234 A | 12/1958 | Seglem et al. | |
| 2,885,859 A | 5/1959 | Barberis | |
| 2,958,196 A | 11/1960 | Wie et al. | |
| 2,967,224 A | 1/1961 | Irwin | |
| 3,009,321 A | 11/1961 | Jones et al. | |
| 3,487,636 A | 1/1970 | Scott et al. | |
| 3,558,251 A | 1/1971 | Bauger et al. | |
| 3,690,093 A | 9/1972 | Carlisle | |
| 3,898,797 A | 8/1975 | Wood | |
| 3,954,389 A | 5/1976 | Szetela | |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,141,213 A | 2/1979 | Ross | |
| 4,192,139 A | 3/1980 | Buchheim | |
| 4,194,358 A | 3/1980 | Stenger | |
| 4,351,156 A | 9/1982 | White et al. | |
| 4,412,414 A | 11/1983 | Novick et al. | |
| 4,441,323 A | 4/1984 | Colley | |
| 4,828,488 A | 5/1989 | Reiser et al. | |
| 4,860,533 A | 8/1989 | Joshi | |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A | 10/1997 | Defreitas et al. | |
| 5,695,328 A | 12/1997 | Defreitas et al. | |
| 5,720,163 A | 2/1998 | Pfefferle et al. | |
| 5,744,206 A * | 4/1998 | Russek | D04C 1/12 87/8 |
| 5,845,480 A | 12/1998 | Defreitas et al. | |
| 6,138,654 A | 10/2000 | Pretorius et al. | |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 | 10/2016 | Munson | |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 10,711,699 B2 | 7/2020 | Dam et al. | |
| 10,823,398 B2 | 11/2020 | Choudhri et al. | |
| 11,209,164 B1 | 12/2021 | Ryon et al. | |
| 11,226,103 B1 | 1/2022 | Ryon et al. | |
| 11,255,535 B1 | 2/2022 | Eckert et al. | |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0036209 A1 | 2/2008 | Bulkovitch | |
| 2008/0141651 A1 | 6/2008 | Eason et al. | |
| 2008/0299504 A1 | 12/2008 | Horn | |
| 2009/0234555 A1 | 9/2009 | Williams et al. | |
| 2009/0314000 A1 | 12/2009 | Evulet et al. | |
| 2010/0043444 A1 | 2/2010 | Gross et al. | |
| 2010/0126617 A1 * | 5/2010 | Stroempl | F16L 11/125 138/137 |
| 2011/0088409 A1 | 4/2011 | Carlisle | |
| 2011/0113787 A1 | 5/2011 | Milosavljevic | |
| 2011/0247590 A1 | 10/2011 | Donovan | |
| 2011/0271684 A1 | 11/2011 | Corsmeier et al. | |
| 2012/0085468 A1 | 4/2012 | Walker | |
| 2012/0125008 A1 | 5/2012 | Prociw et al. | |
| 2013/0000323 A1 | 1/2013 | Kupratis | |
| 2013/0040255 A1 | 2/2013 | Shi et al. | |
| 2013/0143171 A1 | 6/2013 | Soda et al. | |
| 2013/0174562 A1 | 7/2013 | Holcomb et al. | |
| 2013/0283800 A1 | 10/2013 | Romig et al. | |
| 2014/0060063 A1 | 3/2014 | Boardman et al. | |
| 2014/0150401 A1 | 6/2014 | Venter | |
| 2014/0215997 A1 * | 8/2014 | Lior | F02C 7/22 60/39.01 |
| 2014/0216384 A1 | 8/2014 | Tanaka et al. | |
| 2014/0260304 A1 | 9/2014 | Cummings et al. | |
| 2014/0290259 A1 | 10/2014 | Plante et al. | |
| 2014/0314548 A1 | 10/2014 | Rivers et al. | |
| 2014/0366505 A1 | 12/2014 | Prociw et al. | |
| 2014/0366542 A1 | 12/2014 | Teets | |
| 2014/0366551 A1 | 12/2014 | Prociw et al. | |
| 2015/0036781 A1 | 2/2015 | Youssef | |
| 2015/0040575 A1 | 2/2015 | Martinez Fabre et al. | |
| 2015/0260406 A1 | 9/2015 | Carrere | |
| 2015/0275755 A1 | 10/2015 | Ogata et al. | |
| 2015/0275769 A1 | 10/2015 | Foutch et al. | |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2015/0354517 A1 | 12/2015 | Mansour et al. | |
| 2016/0003150 A1 | 1/2016 | Dicintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1 | 6/2016 | Myers et al. | |
| 2016/0230993 A1 | 8/2016 | Dai et al. | |
| 2017/0082022 A1 | 3/2017 | Lee | |
| 2017/0138266 A1 * | 5/2017 | Caples | B23P 15/00 |
| 2017/0145852 A1 | 5/2017 | McCune et al. | |
| 2017/0284298 A1 | 10/2017 | Suciu et al. | |
| 2017/0298822 A1 | 10/2017 | Garde La Casa | |
| 2017/0350590 A1 | 12/2017 | Choudhri et al. | |
| 2017/0356656 A1 | 12/2017 | Ogata et al. | |
| 2018/0003388 A1 | 1/2018 | Park | |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 | 6/2018 | Pal et al. | |
| 2018/0179956 A1 | 6/2018 | Wertz | |
| 2018/0283692 A1 * | 10/2018 | Ryon | F23R 3/283 |
| 2018/0356095 A1 | 12/2018 | Patel et al. | |
| 2018/0363555 A1 | 12/2018 | Zelina et al. | |
| 2019/0010872 A1 | 1/2019 | Dam et al. | |
| 2019/0024897 A1 | 1/2019 | Prociw et al. | |
| 2019/0032561 A1 | 1/2019 | Stoia et al. | |

(56) References Cited

U.S. PATENT DOCUMENTS

| | | | |
|---|---|---|---|
| 2019/0178497 A1 | 6/2019 | Jones et al. |
| 2019/0249877 A1 | 8/2019 | Fryer |
| 2020/0080530 A1 | 3/2020 | Freer et al. |
| 2020/0088409 A1 | 3/2020 | Greenfield et al. |
| 2020/0191059 A1 | 6/2020 | Ryon et al. |
| 2020/0309378 A1 | 10/2020 | Dam et al. |
| 2020/0348024 A1 | 11/2020 | Hicks |
| 2021/0215100 A1 | 7/2021 | Head et al. |
| 2022/0007488 A1 | 1/2022 | Bai et al. |

FOREIGN PATENT DOCUMENTS

| | | | |
|---|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.
Extended European Search Report for EP Application No. 21205393.8, dated Mar. 17, 2022, 8 pages.
"Metal Seal Design Guide—High Performance Engineered Seals and Sealing Systems", from Parker Hannifin Corporation Composite Sealing Systems Division, 2016, 106 pages.
Database WPI—2017 Clarivate Analytics, Week 201919, Thomson Scientific, London GB; AN 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21209057.5, dated Jul. 19, 2022, 8 pages.
Extended European Search Report for EP Application No. 21214883.7, dated May 13, 2022, pp. 10.
Extended European Search Report for EP Application No. 21216163.2, dated May 16, 2022, pp. 8.
Extended European Search Report for EP Application No. 21212869.8, dated Apr. 28, 2022, pp. 7.
Extended European Search Report for EP Application No. 21213899.4, dated May 6, 2022, 8 pages.
Extended European Search Report for EP Application No. 21214511.4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.

* cited by examiner

CONFORMAL AND FLEXIBLE WOVEN HEAT SHIELDS FOR GAS TURBINE ENGINE COMPONENTS

BACKGROUND

The present disclosure relates to gas turbine engines and, more particularly, to heat shields suitable for rigid components, such as fuel structures, disposed within the combustor section of a gas turbine engine.

Fuel injectors, fuel manifolds, and other rigid gas turbine components are exposed to high-temperature conditions in the combustor section of gas turbine engines. These high-temperature conditions can exceed the melting temperature of the material used to construct the component, negatively impacting the material integrity of the component. Further, fuel structures exposed to the high-temperature conditions of the combustor section can experience internal coking due to fuel degradation at high temperatures. Heat shields can be used to protect fuel injectors, fuel manifolds, and other rigid gas turbine components in the combustor section. However, heat shields used to protect rigid components can undergo thermal expansion under the high-temperature conditions of the combustor case, potentially causing mechanical damage to the rigid components as they expand. Mechanical damage to fuel injectors or manifolds can cause fuel to leak into the combustor case and combust outside of the combustor, causing further damage to the gas turbine engine.

SUMMARY

The present disclosure provides an embodiment of a heat shielded assembly including a fuel structure of a combustor of a gas turbine engine and a woven heat shield at least partially conformally surrounding the fuel structure and spaced from an exterior of the fuel structure by a distance where it surrounds the fuel structure. The fuel structure is configured to deliver fuel to the combustor. The woven heat shield comprises a first set of strands, a second set of strands interwoven with the first set of strands, and a weave pattern comprising the first set of strands and the second set of strands. Each strand of the first set of strands extends in a first direction, each strand of the second set of strands extends in a second direction transverse to the first direction, and the first set of strands and the second set of strands are not attached where they intersect in the weave pattern, such that the first set of strands are able to move relative to the second set of strands when undergoing thermal expansion.

The present disclosure further provides an embodiment of a method of forming a heat shield for a rigid component of a combustor section of a gas turbine engine including additively manufacturing the rigid component and additively manufacturing a woven heat shield around the rigid component. The woven heat shield at least partially conformally surrounds the rigid component and comprises a first set of strands, a second set of strands interwoven with the first set of strands, and a weave pattern comprising the first set of strands and the second set of strands. Each strand of the first set of strands extends in a first direction, each strand of the second set of strands extends in a second direction transverse to the first direction, and the first set of strands and the second set of strands are not attached where they intersect in the weave pattern, such that the first set of strands are able to move relative to the second set of strands when undergoing thermal expansion.

The present disclosure further provides an embodiment of a method of forming a heat shield for a rigid component of a combustor section of a gas turbine engine including additively manufacturing a woven heat shield that is at least partially annular and has a weave pattern, placing the rigid component within the annular portion of the woven structure, and mechanically tightening the weave pattern of the woven heat shield after placing the rigid component within the annular portion to create a conformal fit of the woven heat shield about the rigid component. The annular portion of the woven heat shield has a larger diameter than a dimension of the rigid component before the weave pattern is tightened. The woven heat shield includes a first set of strands, a second set of strands interwoven with the first set of strands, and the weave pattern comprises the first set of strands and second set of strands. Each strand of the first set of strands extends in a first direction and each strand of the second set of strands extends in a second direction transverse to the first direction. The first set of strands and the second set of strands are not attached where they intersect in the weave pattern, such that the first set of strands are able to move relative to the second set of strands when undergoing thermal expansion.

The present summary is provided only by way of example, and not limitation. Other aspects of the present disclosure will be appreciated in view of the entirety of the present disclosure, including the entire text, claims, and accompanying figures.

Figure 1A:
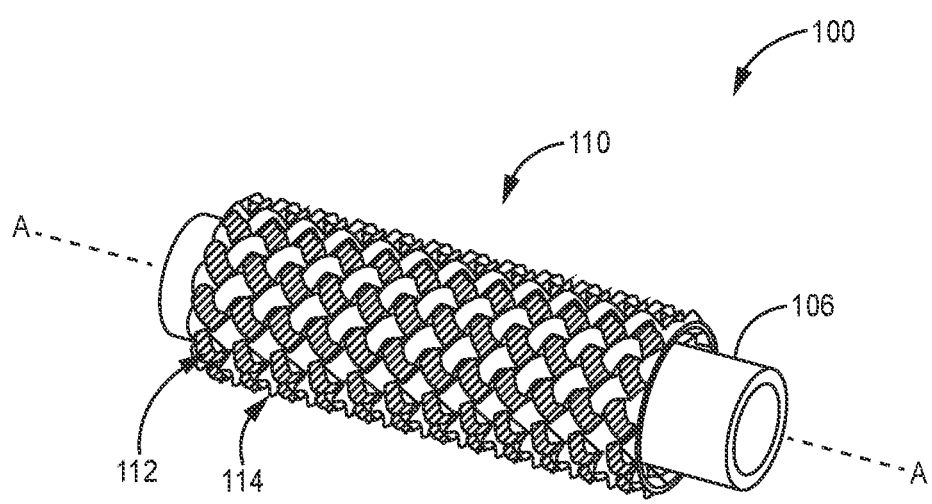
FIG. 1A is a perspective view of an example of a flexible heat shield.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention relates to structures and methods for heat shields for rigid components disposed within the combustion section of a gas turbine engine. The structures and methods disclosed herein allow for the construction of low-weight, flexible heat shields that conformally fit a wide variety of rigid components present in the combustor case. The flexible heat shield structures described herein offer a number of advantages over rigid heat shield designs. Further, the flexible heat shields described herein offer a number of advantages over other flexible heat shield designs, including reduced weight and bulk. The flexible heat shields described herein additionally include woven designs that are able to conformally fit rigid engine components without requiring connections between interwoven strands. The structures disclosed herein can advantageously be formed from high-temperature metallic components readily fabricable via additive manufacturing.

Figure 1B:
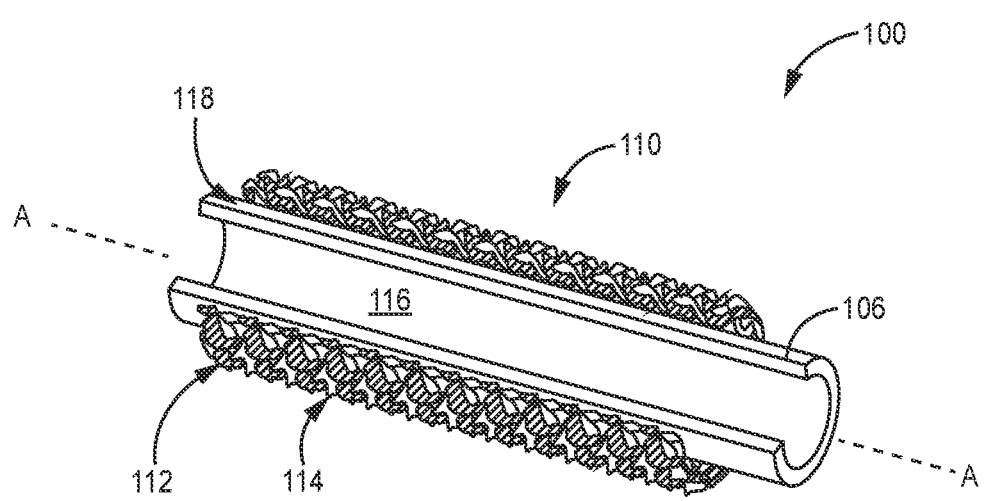
FIG. 1B is a cross-sectional view of the example of a flexible heat shield shown in FIG. 1A.

FIGS. 1A-B depict heat shielded assembly 100, which includes rigid component 106 and flexible heat shield 110. FIG. 1A is a perspective view of heat shielded assembly 100 showing flexible heat shield 110 surrounding rigid component 106. Rigid component 106 is annular and extends linearly along axis A-A. Flexible heat shield 110 includes first strands 112 and second strands 114, which extend helically along axis A-A and transversely with respect to each other, giving heat shield 110 a generally annular overall shape. The helical structures of first strands 112 and second strands 114 are centered on axis A-A. First strands 112 and second strands 114 are interwoven into a weave pattern and take an overall woven structure. The weave pattern shown in FIG. 1 is a plain weave. However, it should be understood that first strands 112 and second strands 114 can be woven in any suitable weave pattern. Notably, first strands 112 and second strands 114 generally do not contact each other where they intersect in the weave and are not attached at those points. As such, first strands 112 and second strands 114 are generally able to move relative to one another within the weave. For example, first strands 112 and second strands 114 can move relative to one another when they undergo thermal expansion.

FIG. 1B is a cross-sectional view of heat shielded assembly 100 showing channel 116 and air gap 118. Channel 116 is formed within rigid component 106 and is centered on axis A-A. First strands 112 and second strands 114 are spaced from an exterior surface of rigid component 106 by a distance, forming air gap 118. Air gap 118 contains stagnate air trapped against an outer surface of 106 by heat shield 110 and functions to insulate rigid component 106 from high-temperature conditions, such as those present in the combustor case of a gas turbine engine.

When exposed to high-temperature conditions, first strands 112 and second strands 114 of flexible heat shield 110 are able to move relative to each other and expand helically along axis A-A without damaging rigid component 106. Further, in examples of rigid component 106 where axial ends of flexible heat shield 110 abut a structure or feature of rigid component 106, the helical structures of first strands 112 and second strands 114 are able to helically compress when first strands 112 and second strands 114 undergo thermal expansion. Further, as depicted in FIGS. 1A-B, first strands 112 and second strands 114 form gaps at the locations where they intersect when heat shield 110 is at an ambient temperature. These gaps are permeable to air but generally are sufficiently small to greatly reduce the flow of air to air gap 118 from a high-temperature air source through flexible heat shield 110, such that the air in air gap 118 is generally stagnated. In operation, the gaps allow the woven structure of first strands 112 and second strands 114 to expand and flex relative to one another when exposed to high-temperature conditions, such as those present in the combustor case of a gas turbine engine. Further, as first strands 112 and second strands 114 thermally expand, they can contact each other and close the aforementioned gaps, reducing gas permeability of flexible heat shield 110 as temperature increases. Due to their interwoven structure, first and second strands 112 and 114 are able to move relative to one another even when flexible heat shield 110 has thermally expanded and the gaps formed therebetween have closed. Notably, first and second strands 112 and 114 are generally separate and not attached, including at high-temperature conditions.

Combined, the helical orientations of first strands 112 and second strands 114 and the gaps formed between them in flexible heat shield 110 allow flexible heat shield 110 to undergo thermal expansion without damaging rigid component 106. Further, this combination allows flexible heat shield 110 to maintain a conformal fit of rigid component 106 even when heat shield 110 undergoes thermal expansion, reducing the overall weight and bulk required to effectively insulate rigid component 106 against the high-temperature conditions as compared to other heat shield designs. When rigid component 106 is a component disposed within the combustor section of a gas turbine engine, the reduced weight of heat shield 110, as compared to other heat shield designs, offers a number of advantages. For example, the reduced weight of heat shield 110 reduces the overall weight of the gas turbine engine in which it is disposed and, as such, improves the overall fuel efficiency of the engine. Further, conventional heat shield designs use bulky sections that disrupt fluid flow, such as bellows-shaped structures, to improve the flexibility of the heat shield. Heat shield 110 is flexible while adopting a conformal fit that reduces the overall bulk of the heat shield, allowing heat shield 110 both to adequately insulate rigid component 106 and to expand flexibly about rigid component 106 without significantly disrupting fluid flow of air around components disposed within the combustor case, such as fuel injectors or internal manifolds.

Where heat shield 110 is used to shield a fuel injector or internal manifold, the reduced cross-sectional area of heat shield 110 as compared to other heat shields allows for a more uniform flow of air into air passages of fuel injectors or dome swirlers, improving the uniformity of the flow of air into a combustor. Improving the uniformity of the flow of air into a combustor improves combustor liner durability by reducing the incidence of hot spots within the combustor and further allows for the reduction in overall combustor length. Reducing combustor length allows for reduction in the overall engine length, thereby improving drag characteristics of the engine, and further reducing the overall weight of the engine, which improves the fuel efficiency of the engine as described previously.

Figure 2:
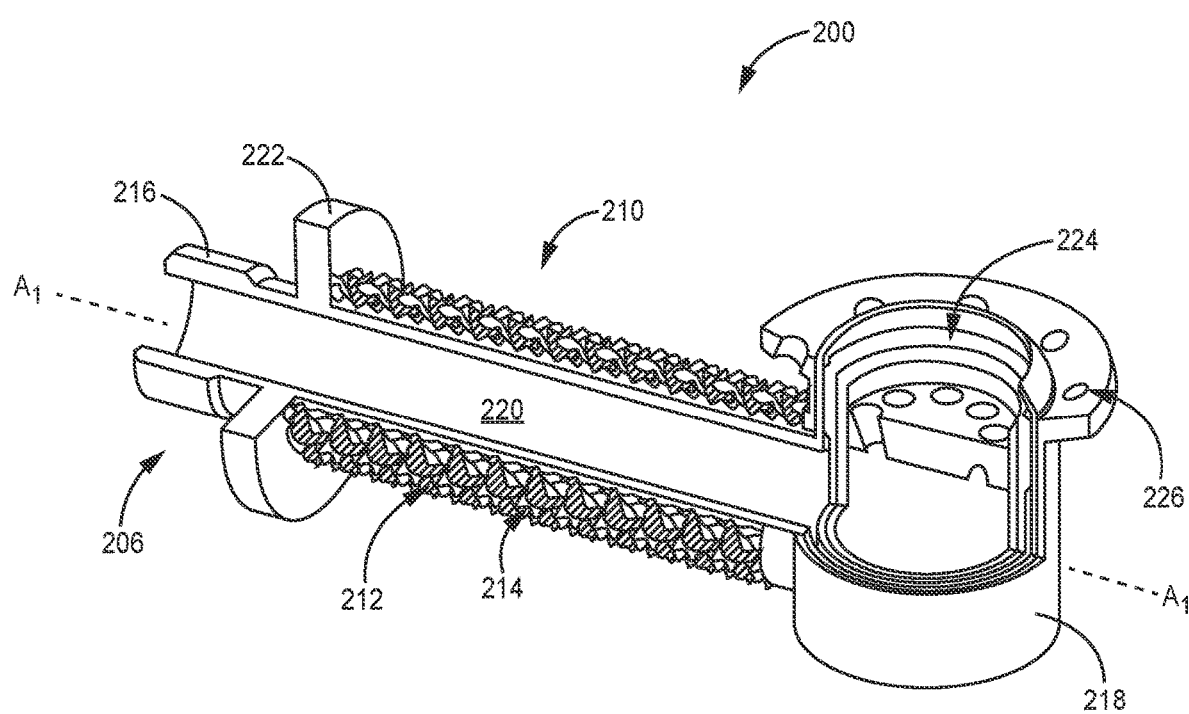
FIG. 2 is a cross-sectional view of an example of a fuel injector assembly with a flexible heat shield as introduced with respect to FIGS. 1A and 1B.

Flexible heat shields according to flexible heat shield 110 can be used to thermally insulate a wide variety of structures present in the combustion section of a gas turbine engine, including fuel structures such as fuel injectors or fuel manifolds. FIG. 2 is a cross-sectional view of heat shielded assembly 200, which includes fuel injector 206 and flexible heat shield 210. Flexible heat shield 210 functions substantially similarly to flexible heat shield 110 and contains first strands 212 and second strands 214, which function and are arranged substantially the same as first strands 112 and second strands 114. Fuel injector 206 includes fuel feed arm 216 and fuel nozzle 218. Generally, fuel feed arm 216 extends outside of the combustor case and connects to a fuel line or fuel source, while fuel nozzle 218 connects to the dome of a main combustor of a gas turbine engine. Fuel feed arm 216 is centered on and extends along axis $A_1$-$A_1$, and has a generally annular shape. The inner wall of fuel feed arm 216 forms channel 220 that is capable of channeling fuel toward fuel nozzle 218 and ultimately the main combustor of the gas turbine engine. Sealing flange 222 extends radially from fuel feed arm 216 and forms a seal against an outer surface of the combustor case where fuel feed arm 216 extends through the combustor case. Fuel nozzle 218 includes nozzle aperture 224 and air swirler 226. Nozzle aperture 224 is configured to inject fuel into a main combustor, while air swirler 226 is configured with multiple swirling apertures that permit air from inside the combustor case to flow into the main combustor and improve mixing between fuel and air within the main combustor.

Heat shield 210 is centered on axis $A_1$-$A_1$ and surrounds fuel feed arm 216 between sealing flange 222 and fuel nozzle 218, forming an insulating air gap that protects fuel feed arm 216 from the high-temperature conditions present within the combustor case, as described previously with respect to rigid component 106 and air gap 118. In FIG. 2, first strands 212 and second strands 214 extend helically with respect to axis $A_1$-$A_1$ and transversely with respect to each other. As described previously with respect to heat shield 110, the helical and interwoven arrangement of first strands 212 and second strands 214 as well as the gaps formed between first strands 212 and second strands 214 advantageously allows the helical, woven structure of heat shield 210 to helically compress between sealing flange 222 and fuel nozzle 218 when it undergoes thermal expansion, preventing heat shield 210 from damaging fuel injector 206. As described previously and with respect to heat shield 110, first strands 212 and second strands 214 are able to move relative to each other at high-temperature conditions, such as at the operating temperature of a gas turbine engine. As also described previously, heat shield 210 is also able to conformally fit fuel injector 206, reducing the bulk and weight required to shield fuel injector 206 from the high-temperature conditions of the combustor case as compared to other heat shield designs.

Figure 3:
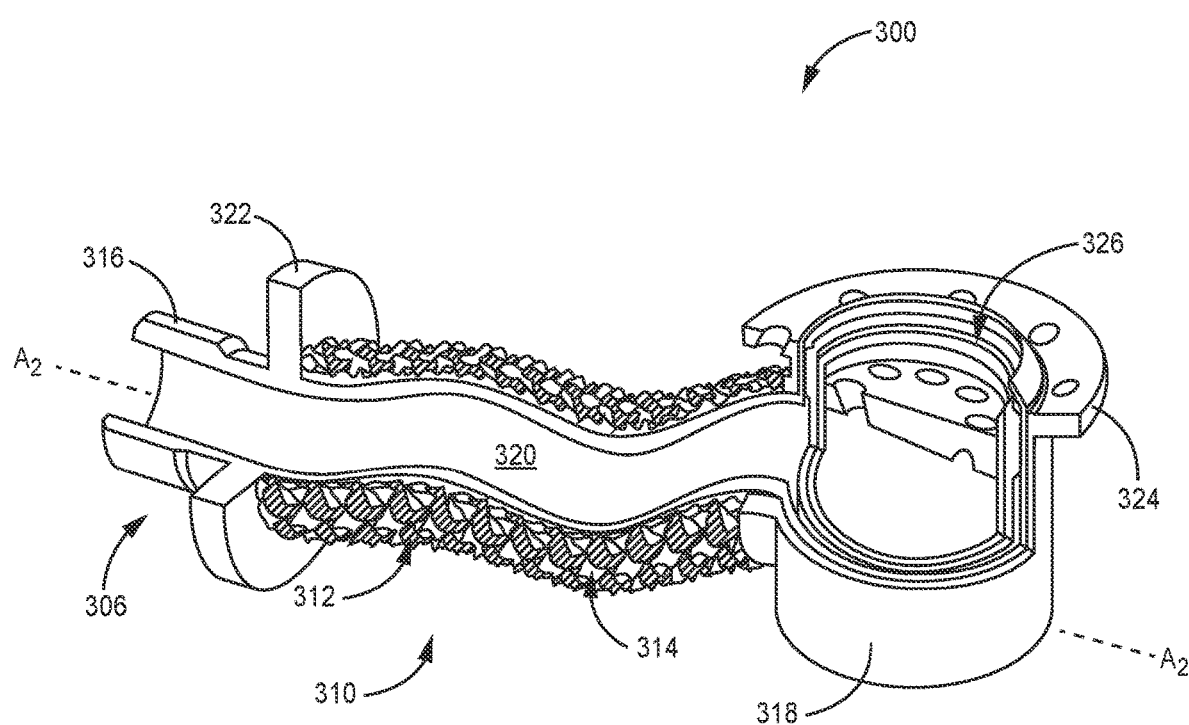
FIG. 3 is a cross-sectional view of an example of a flexible heat shield for a fuel injector having a non-linear shape.

Flexible, woven heat shields described herein are also able to adopt a conformal fit to non-linear structures. FIG. 3 is a cross-sectional view of heat shielded assembly 300, which includes fuel injector 306 and heat shield 310. Heat shield 310 includes first strands 312 and second strands 314, which are arranged substantially the same as first strands 112 and second strands 114 of flexible heat shield 110. Fuel injector 306 is substantially the same as fuel injector 206, and contains fuel feed arm 316 and fuel nozzle 318. Fuel feed arm 316 extends generally along axis $A_2$-$A_2$ and defines channel 320, which is configured to channel a fuel to fuel nozzle 318. Sealing flange 322 extends radially away from fuel feed arm 316 and functions similarly to sealing flange 222. Fuel nozzle 318 includes nozzle aperture 324 and air swirler 326, which function similarly to nozzle aperture 224 and air swirler 226.

As depicted in FIG. 3, fuel feed arm 316 has an illustrative non-linear, zig-zag shape with multiple curved portions. The woven structure of heat shield 310 is able to flexibly mimic the non-linear shape of fuel feed arm 316, creating a conformal fit of fuel feed arm 316. Further, the woven structure of heat shield 310 is able to thermally expand between flange 322 and fuel nozzle 318 as described previously with respect to heat shield 110, reducing the likelihood of mechanical damage to fuel injector 306 when heat shield 310 undergoes thermal expansion. Specifically, the interwoven structure of first strands 312 and second strands 314 allow for heat shield 310 to undergo thermal expansion while maintaining a conformal fit of the complex structure of fuel injector 306. While fuel feed arm 316 is shown as having a non-linear, zig-zag shape, it should be understood that flexible heat shield 310 and any heat shield disclosed herein can conformally fit any non-linear, complex structure of a rigid component due to the flexibility imparted by the interwoven structure of the heat shields disclosed herein, allowing for a greater range of fuel injector designs for use with the combustor of a gas turbine engine.

While heat shields described herein have been described as conformally fitting the substantially annular shapes of rigid component 106, fuel feed arm 216, and fuel feed arm 316, the woven heat shield designs disclosed herein can be equipped with one or more grommets to fit branching structures, such as multiple fuel feed lines connected to a fuel manifold.

Figure 4A:
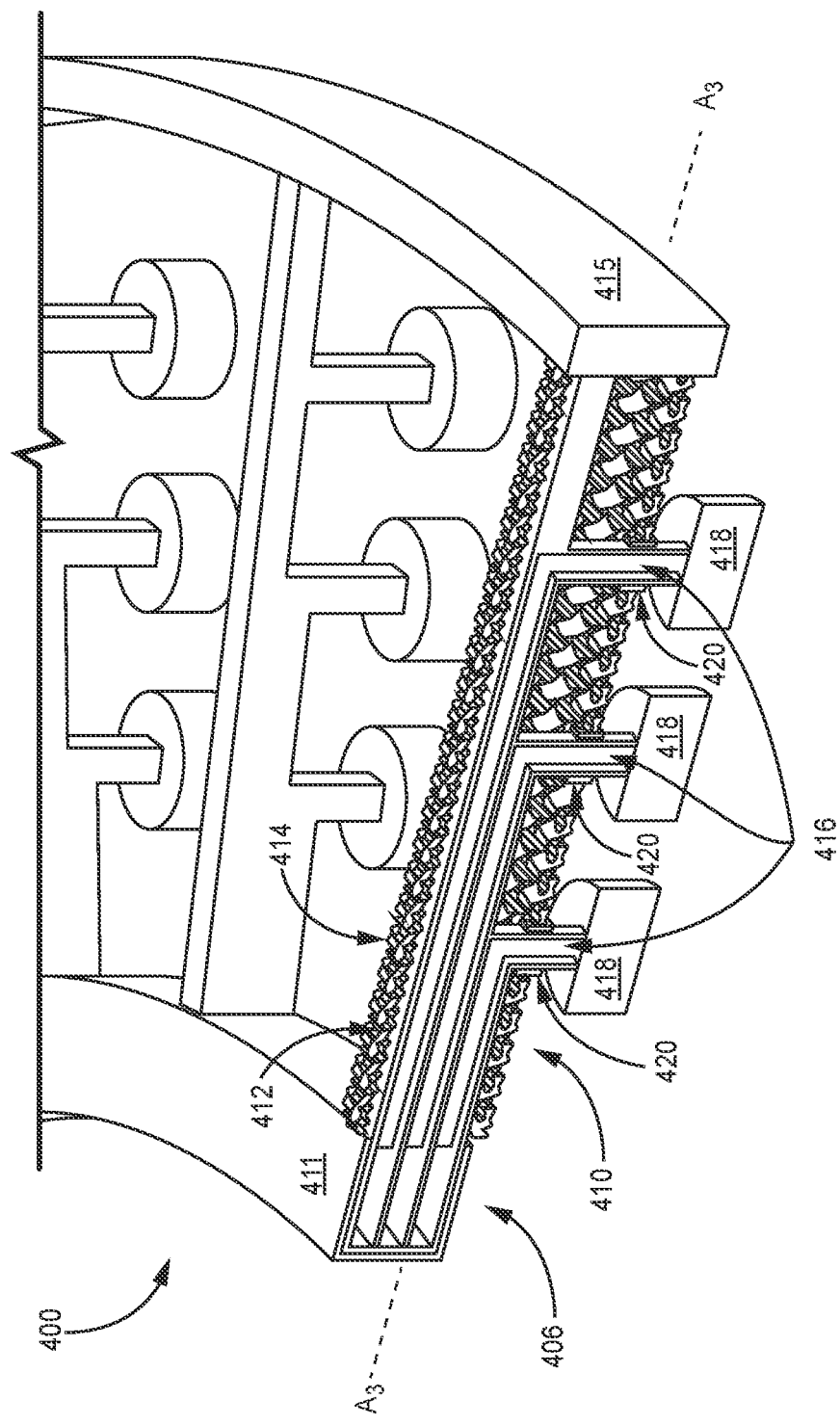
FIG. 4A is a cross-sectional view of an example of a flexible heat shield for a fuel manifold assembly.
Figure 4B:
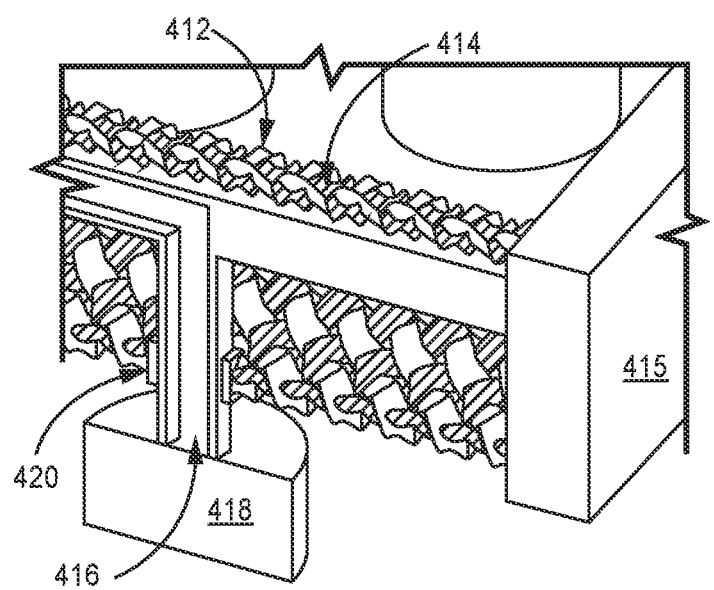
FIG. 4B is a zoomed-in cross-sectional view of the example of a flexible heat shield depicted in FIG. 4A.

FIGS. 4A-B depict heat shielded assembly 400, which includes fuel manifold assembly 406 and heat shield 410. FIG. 4A is a cross sectional view of heat shielded assembly 400 showing the overall structure of heat shield 410. Heat shield 410 includes first strands 412 and second strands 414, which function and are formed substantially the same as first strands 112 and second strands 114, and extends generally along axis $A_3$-$A_3$ between fuel manifold 411 and outer ring 415. In the depicted example, fuel manifold 411 supplies fuel to three fuel feed arms 416, which extend parallel to axis $A_3$ where they connect to fuel manifold 411 and transverse to axis $A_3$ where they connect to fuel nozzles 418, which are configured to deliver fuel to a main combustor of a gas turbine engine. Heat shield 410 is attached to grommets 420, which surround the transversely-extending portions of fuel feed arms 416 and allow fuel feed arms 416 to extend through heat shield 410 to connect to fuel nozzles 418. FIG. 4B is a cross-sectional view of heat shielded assembly 400 more clearly showing the attachment of heat shield 410 to a grommet 420.

First strands 412 and second strands 414 are able to helically compress along axis $A_3$-$A_3$ between fuel manifold 411 and outer ring 415 when heat shield 410 undergoes thermal expansion. First strands 412 and second strands 414 are also able to helically compress relative to grommets 420 and the transverse portions of fuel feed arms 416 when heat shield 410 undergoes thermal expansion, in part due to the interwoven arrangement of first strands 412 and second strands 414. Further, as described previously with respect to first strands 112 and second strands 114, first strands 412 and second strands 414 generally do not touch where they intersect and form gaps at those locations at an ambient temperature. The gaps allow for first strands 412 and second strands 414 to expand and flex relative to one another when they undergo thermal expansion.

Any of the heat shields disclosed herein can be formed via additive manufacturing and can be formed from a metal material readily fabricable via additive manufacturing (e.g., Inconel, high-temperature steel, other nickel alloys, etc.). Exemplary additive manufacturing processes include but are not limited to powder bed fusion techniques such as direct metal laser sintering (DMLS), laser net shape manufacturing (LNSM), electron beam manufacturing (EBM). Support-free additive manufacturing techniques, such as binder jetting, can also be used to form components of any heat shield disclosed herein. Additive manufacturing is particularly useful in obtaining unique geometries, such as the helical shapes and interwoven shapes of first strands 112 and second strands 114 of heat shield 110. As a further example, additive manufacturing can be used to produce the gapped structure of heat shields described herein, such as the gaps formed between first strands 112 and second strands 114 of heat shield 110.

Figure 5:
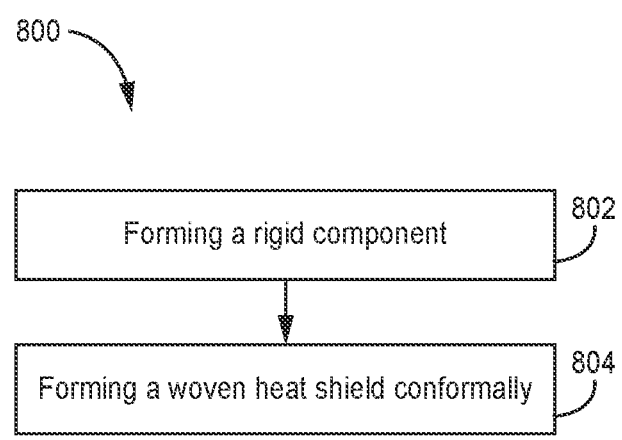
FIG. 5 is a flow diagram of an example of a method of forming a flexible heat shield.

FIG. 5 is a flow diagram of method 800, which can be used to fabricate any of the heat shielded assemblies described herein. Method 800 contains steps of forming a rigid component (802) and forming a woven heat shield conformally about the rigid component (804). In step 802, the rigid component is formed via additive manufacturing, casting, machining, or another suitable manufacturing process. Generally, the rigid component is formed from a metal material. The rigid component can be, for example, rigid component 106, fuel injector 206, fuel injector 306, or fuel manifold assembly 406. Where the component is additively manufactured, it can be additively manufactured according to an exemplary additive manufacturing process described previously.

In step 804, a woven heat shield is formed conformally about the rigid component. The woven heat shield is generally composed of interwoven but otherwise unattached strands. For example, the woven heat shield can be any of heat shields 110, 210, 310, or 410. Generally, the woven heat shield is formed via an additive manufacturing process, such as by an exemplary additive manufacturing process described previously. Generally, the conformal fit of the woven heat shield creates an insulating air gap between an inner surface of the woven heat shield and an outer surface of the rigid component. Steps 802 and 804 can be performed sequentially, wherein the rigid component is formed and then the woven heat shield is additively manufactured about the fully-formed rigid component. Alternatively, where the rigid component is formed via additive manufacturing, steps 802 and 804 can be performed simultaneously or substantially simultaneously. In these examples, the woven heat shield can be formed with a conformal fit of the rigid component as the rigid component is additively manufactured. Where the heat shielded assembly produced by method 800 includes a grommet, the grommet can be also be formed by additive manufacturing. For ease of manufacturing, the grommet can be formed integrally with strands of the woven heat shield or the woven heat shield can be attached to the grommet in later steps, such as by welding or brazing.

Figure 6:
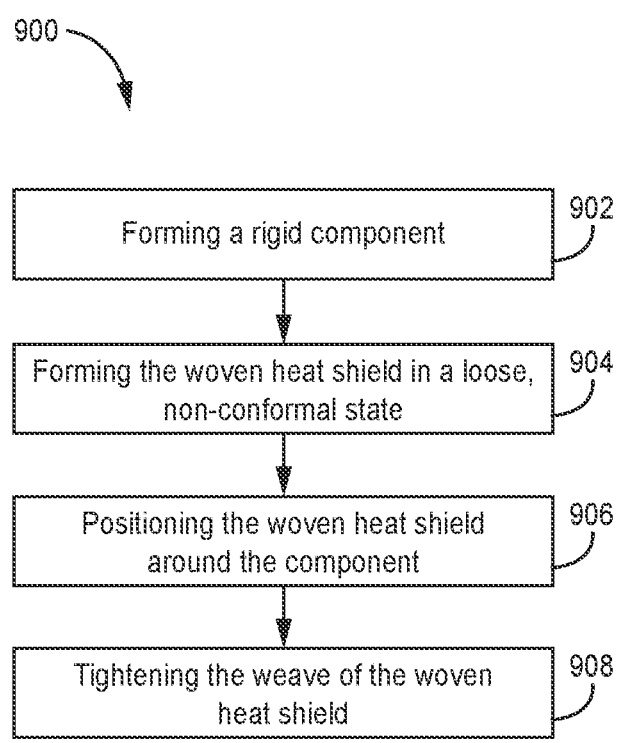
FIG. 6 is a flow diagram of an alternative example of a method of forming a flexible heat shield.

FIG. 6 is a flow diagram of method 900 that can be used to fabricate any of the heat shielded assemblies described herein. Method 900 contains steps of forming a rigid component (902), forming a woven heat shield in a loose and non-conformal state (904), fitting the woven heat shield around the component (906), and tightening the weave of the woven heat shield (908). In step 902, the rigid component is formed via additive manufacturing, casting, machining, or another suitable manufacturing process. Generally, the rigid component is formed from a metal material. The rigid component can be, for example, rigid component 106, fuel injector 206, fuel injector 306, or fuel manifold assembly 406.

In step 904, the woven heat shield is formed in a loose and non-conformal state. The woven heat shield is generally formed via an additive manufacturing process, such as by an exemplary additive manufacturing process described previously. The woven heat shield is generally formed as a loose tube or annulus, with the center space of the woven heat shield sized large enough to accommodate the rigid component. In step 906, the woven heat shield is positioned around the component. The component may be moved relative to the woven heat shield, or the woven heat shield may be moved relative to the component.

In step 908, the weave of the woven heat shield is tightened to give the woven heat shield a conformal fit about the rigid component. The conformal fit of the woven heat shield creates an insulating air gap between an inner surface of the woven heat shield and an outer surface of the rigid component while reducing the overall bulk and weight of the heat shield. The weave of the woven heat shield is generally selected to be able to be mechanically tightened about the rigid component, such that mechanically pulling on one or more interwoven strands of the woven heat shield causes the fit of the woven heat shield to tighten about the rigid component. Where the heat shielded assembly includes a grommet, the grommet is generally attached by a separate manufacturing step, such as welding or brazing.

While the flexible heat shields described herein have been generally described as containing a single layer of two sets of interwoven strands, it should be understood that the heat shields described herein can have multiple layers formed from multiple sets of interwoven strands. Each layer can be formed similarly to a heat shield described herein. Further, while the flexible heat shields described herein have been depicted as having a plain weave pattern, it should be understood that the heat shields described may have any suitable weave pattern. Possible alternative weave patterns include, but are not limited to, a satin weave, a twill weave, or a basket weave.

It should be understood that the methods disclosed herein allow for the construction of woven heat shields that can conformally and flexibly fit components having a variety of shapes, including components having shapes more complex than any of rigid component 106, fuel injector 206, fuel injector 306, or fuel manifold assembly 406. In particular, the use of additive manufacturing techniques, as described herein, allows for the construction of woven heat shields capable of conformally and flexibly fitting highly-branched structures, including structures having more branch points or a more complex branching structure than fuel manifold assembly 406, and structures having highly complex non-linear shapes, including structures having non-linear shapes that are more complex than the non-linear shape illustrated with respect to fuel injector 306.

The embodiments described herein advantageously allow for heat shields to both conformally fit rigid components, such as fuel injectors or manifolds, exposed to high-temperature conditions in a combustor case of a gas turbine engine and to flexibly undergo thermal expansion without damaging those rigid components. Further, the embodiments described herein advantageously allow for a greater range of fuel injector designs for use with the combustor of a gas turbine engine while reducing heat shield bulk and weight.

Discussion of Possible Embodiments

The following are non-exclusive descriptions of possible embodiments of the present invention.

An embodiment of a heat shielded assembly includes a fuel structure of a combustor of a gas turbine engine and a woven heat shield at least partially conformally surrounding the fuel structure and spaced from an exterior of the fuel structure by a distance where it surrounds the fuel structure. The fuel structure is configured to deliver fuel to the combustor. The woven heat shield comprises a first set of strands, a second set of strands interwoven with the first set of strands, and a weave pattern comprising the first set of strands and the second set of strands. Each strand of the first set of strands extends in a first direction, each strand of the second set of strands extends in a second direction transverse to the first direction, and the first set of strands and the second set of strands are not attached where they intersect in the weave pattern, such that the first set of strands are able to move relative to the second set of strands when undergoing thermal expansion.

The heat shielded assembly of the preceding paragraph can optionally include, additionally and/or alternatively, any one or more of the following features, configurations and/or additional components:

A heat shielded assembly according to an exemplary embodiment of this disclosure, among other possible things includes a fuel structure of a combustor of a gas turbine engine and a woven heat shield at least partially conformally surrounding the fuel structure and spaced from an exterior of the fuel structure by a distance where it surrounds the fuel structure. The fuel structure is configured to deliver fuel to the combustor. The woven heat shield comprises a first set of strands, a second set of strands interwoven with the first set of strands, and a weave pattern comprising the first set of strands and second set of strands. Each strand of the first set of strands extends in a first direction, each strand of the second set of strands extends in a second direction transverse to the first direction, and the first set of strands and the second set of strands are not attached where they intersect in the weave pattern, such that the first set of strands are able to move relative to the second set of strands when undergoing thermal expansion.

A further embodiment of the foregoing heat shielded assembly, wherein the fuel structure is centered on the axis, and each strand of at least one of the first set of strands or the second set of strands extends helically about the axis.

A further embodiment of any of the foregoing heat shielded assemblies, wherein the first set of strands and the second set of strands are able to compress when undergoing thermal expansion.

A further embodiment of any of the foregoing heat shielded assemblies, wherein the first set of strands and the second set of strands are able to helically compress when undergoing thermal expansion.

A further embodiment of any of the foregoing heat shielded assemblies, wherein the fuel structure, the first set of strands, and the second set of strands are additively manufactured.

A further embodiment of any of the foregoing heat shielded assemblies, wherein the woven heat shield is attached to a grommet that surrounds a portion of the fuel structure.

A further embodiment of any of the foregoing heat shielded assemblies, wherein the fuel structure is a fuel injector.

A further embodiment of any of the foregoing heat shielded assemblies, wherein the fuel structure extends non-linearly along an axis and adopts a curved or zig-zag shape.

A further embodiment of any of the foregoing heat shielded assemblies, wherein the first set of strands and second set of strands are not attached at an operating temperature of the gas turbine engine.

A further embodiment of any of the foregoing heat shielded assemblies, wherein the fuel structure is a fuel manifold.

A further embodiment of any of the foregoing heat shielded assemblies, wherein each strand of the first set of strands and the second set of strands does not contact any other strand of the first set of strands and the second set of strands at an ambient temperature.

A further embodiment of any of the foregoing heat shielded assemblies, further comprising gaps formed in the weave pattern and disposed between the first set of strands and the second set of strands.

A further embodiment of any of the foregoing heat shielded assemblies, wherein the gaps separate the first set of strands and the second set of strands and are permeable to air.

A further embodiment of any of the foregoing heat shielded assemblies, wherein at least one of the first set of strands, the second set of strands, or the first set of strands and the second set of strands comprises a metal material.

An embodiment of a method of forming a heat shield for a rigid component of a combustor section of a gas turbine engine includes additively manufacturing the rigid component and additively manufacturing a woven heat shield around the rigid component. The woven heat shield at least partially conformally surrounds the rigid component and comprises a first set of strands, a second set of strands interwoven with the first set of strands, and a weave pattern comprising the first set of strands and the second set of strands. Each strand of the first set of strands extends in a first direction, each strand of the second set of strands extends in a second direction transverse to the first direction, and the first set of strands and the second set of strands are not attached where they intersect in the weave pattern, such that the first set of strands are able to move relative to the second set of strands when undergoing thermal expansion.

The method of forming a heat shield of the preceding paragraph can optionally include, additionally and/or alternatively, any one or more of the following features, configurations and/or additional components:

A method of forming a heat shield for a rigid component of a combustor section of a gas turbine engine according to an exemplary embodiment of this disclosure, among other possible things includes additively manufacturing the rigid component and additively manufacturing a woven heat shield around the rigid component. The woven heat shield at least partially conformally surrounds the rigid component and comprises a first set of strands, a second set of strands interwoven with the first set of strands, and a weave pattern comprising the first set of strands and the second set of strands. Each strand of the first set of strands extends in a first direction, each strand of the second set of strands extends in a second direction transverse to the first direction, and the first set of strands and the second set of strands are not attached where they intersect in the weave pattern, such that the first set of strands are able to move relative to the second set of strands when undergoing thermal expansion.

A further embodiment of the foregoing method of forming a heat shield, wherein the woven heat shield is radially spaced from an exterior of the rigid component by a distance.

A further embodiment of any of the foregoing methods of forming a heat shield, wherein the woven heat shield includes gaps formed between the first set of strands and the second set of strands, and the gaps are permeable to air.

A further embodiment of any of the foregoing methods of forming a heat shield, wherein the woven heat shield is additively manufactured as the rigid component is additively manufactured.

A further embodiment of any of the foregoing methods of forming a heat shield, wherein the rigid component is additively manufactured before the woven heat shield is additively manufactured.

An embodiment of a method of forming a heat shield for a rigid component of a combustor section of a gas turbine engine includes additively manufacturing a woven heat shield that is at least partially annular and has a weave pattern, placing the rigid component within the annular portion of the woven structure, and mechanically tightening the weave pattern of the woven heat shield after placing the rigid component within the annular portion to create a conformal fit of the woven heat shield about the rigid component. The annular portion of the woven heat shield has a larger diameter than a dimension of the rigid component before the weave pattern is tightened. The woven heat shield includes a first set of strands, a second set of strands interwoven with the first set of strands, and the weave pattern comprises the first set of strands and second set of strands. Each strand of the first set of strands extends in a first direction and each strand of the second set of strands extends in a second direction transverse to the first direction. The first set of strands and the second set of strands are not attached where they intersect in the weave pattern, such that the first set of strands are able to move relative to the second set of strands when undergoing thermal expansion.

The method of forming a heat shield of the preceding paragraph can optionally include, additionally and/or alternatively, any one or more of the following features, configurations and/or additional components:

A method of forming a heat shield for a rigid component of a combustor section of a gas turbine engine according to an exemplary embodiment of this disclosure, among other possible things includes additively manufacturing a woven heat shield that is at least partially annular and has a weave pattern, placing the rigid component within the annular portion of the woven structure, and mechanically tightening the weave pattern of the woven heat shield after placing the rigid component within the annular portion to create a conformal fit of the woven heat shield about the rigid component. The annular portion of the woven heat shield has a larger diameter than a dimension of the rigid component before the weave pattern is tightened. The woven heat shield includes a first set of strands, a second set of strands interwoven with the first set of strands, and the weave pattern comprises the first set of strands and second set of strands. Each strand of the first set of strands extends in a first direction and each strand of the second set of strands extends in a second direction transverse to the first direction. The first set of strands and the second set of strands are not attached where they intersect in the weave pattern, such that the first set of strands are able to move relative to the second set of strands when undergoing thermal expansion.

A further embodiment of the foregoing method of forming a heat shield, wherein the woven heat shield is radially spaced from an exterior of the rigid component after the conformal fit is created.

A further embodiment of any of the foregoing methods of forming a heat shield, wherein the woven heat shield includes gaps formed between the first set of strands and the second set of strands after the weave is tightened, and the gaps are permeable to air.

A further embodiment of any of the foregoing methods of forming a heat shield, wherein the rigid component is a fuel injector or a fuel manifold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat shielded assembly comprising:
   a fuel structure of a combustor of a gas turbine engine, wherein the fuel structure is configured to deliver fuel to the combustor; and
   a woven heat shield at least partially conformally surrounding the fuel structure and spaced from an exterior of the fuel structure by a distance where the woven heat shield conformally surrounds the fuel structure, the woven heat shield comprising:
      a first set of strands, wherein each strand of the first set of strands extends in a first direction;
      a second set of strands interwoven with the first set of strands, wherein each strand of the second set of strands extends in a second direction transverse to the first direction;
      a weave pattern comprising the first set of strands and the second set of strands, wherein the first set of strands and the second set of strands are not attached where they intersect in the weave pattern, such that the first set of strands are able to move relative to the second set of strands when undergoing thermal expansion;
      wherein:
         each strand of the first set of strands and the second set of strands does not contact any other strand of the first set of strands and the second set of strands at an ambient temperature;
         the woven heat shield defines an air gap that extends between an inner surface of the woven heat shield and an outer surface of the fuel structure; and
         the woven heat shield is configured to trap an insulating layer of stagnant air against the outer surface of the fuel structure.

2. The heat shielded assembly of claim 1, wherein the fuel structure is centered on an axis, and each strand of at least one of the first set of strands or the second set of strands extends helically about the axis.

3. The heat shielded assembly of claim 2, wherein the first set of strands and the second set of strands are able to compress when undergoing thermal expansion.

4. The heat shielded assembly of claim 1, wherein the fuel structure, the first set of strands, and the second set of strands are additively manufactured.

5. The heat shielded assembly of claim 1, wherein the woven heat shield is attached to a grommet that surrounds a portion of the fuel structure.

6. The heat shielded assembly of claim 1, wherein the fuel structure is a fuel injector or a fuel manifold.

7. The heat shielded assembly of claim 1, wherein the fuel structure extends non-linearly along an axis and adopts a curved or zig-zag shape.

8. The heat shielded assembly of claim 1, wherein the first set of strands and second set of strands are not attached at an operating temperature of the gas turbine engine.

9. The heat shielded assembly of claim 1, further comprising gaps formed in the weave pattern and disposed between the first set of strands and the second set of strands, wherein the gaps separate the first set of strands and the second set of strands and are permeable to fluids.

10. The heat shielded assembly of claim 1, wherein at least one of the first set of strands, the second set of strands, or the first set of strands and the second set of strands comprises a metal material.

11. A method of forming a heat shield for a rigid component of a combustor section of a gas turbine engine comprising the rigid component is a fuel structure of a combustor of the combustor section of the gas turbine engine, wherein the fuel structure is configured to deliver fuel to the combustor; and the method further comprising:

additively manufacturing the fuel structure; and additively manufacturing a woven heat shield around the fuel structure, wherein the woven heat shield at least partially conformally surrounds the fuel structure and is spaced from an exterior of the fuel structure by a distance where the woven heat shield conformally surrounds the fuel structure, the woven heat shield comprising:
- a first set of strands, wherein each strand of the first set of strands extends in a first direction;
- a second set of strands interwoven with the first set of strands, wherein each strand of the second set of strands extends in a second direction transverse to the first direction; and
- a weave pattern comprising the first set of strands and the second set of strands, wherein the first set of strands and the second set of strands are not attached where they intersect in the weave pattern, such that the first set of strands are able to move relative to the second set of strands when undergoing thermal expansion;

wherein:
- each strand of the first set of strands and the second set of strands does not contact any other strand of the first set of strands and the second set of strands at an ambient temperature;
- the woven heat shield defines an air gap that extends between an inner surface of the woven heat shield and an outer surface of the fuel structure; and
- the woven heat shield is configured to trap an insulating layer of stagnant air against the outer surface of the fuel structure.

12. The method of claim 11, wherein the woven heat shield includes gaps formed between the first set of strands and the second set of strands, and the gaps are permeable to air.

13. The method of claim 11, wherein the woven heat shield is additively manufactured at the same time as the fuel structure.

14. The method of claim 11, wherein the fuel structure is additively manufactured before the woven heat shield is additively manufactured.

15. A method of forming a heat shield for a rigid component of a combustor section of a gas turbine engine comprising the rigid component is a fuel structure of a combustor of the combustor section of the gas turbine engine, wherein the fuel structure is configured to deliver fuel to the combustor; and the method further comprising:

additively manufacturing a woven heat shield, wherein the woven heat shield is at least partially annular and the annular portion has a larger diameter than a dimension of the fuel structure; the woven heat shield comprising:
- a first set of strands, wherein each strand of the first set of strands extends in a first direction;
- a second set of strands interwoven with the first set of strands, wherein each strand of the second set of strands extends in a second direction transverse to the first direction; and
- a weave pattern comprising the first set of strands and the second set of strands;

placing the fuel structure within the annular portion of the woven heat shield;

and mechanically tightening the weave pattern of the woven heat shield after placing the fuel structure within the annular portion to create a conformal fit of the woven heat shield about the fuel structure, wherein the woven heat shield at least partially conformally surrounds the fuel structure and is spaced from an exterior of the fuel structure by a distance where the woven heat shield conformally surrounds the fuel structure, wherein the first set of strands and the second set of strands are not attached where they intersect in the weave pattern, such that the first set of strands are able to move relative to the second set of strands when undergoing thermal expansion;

wherein:
- each strand of the first set of strands and the second set of strands does not contact any other strand of the first set of strands and the second set of strands at an ambient temperature;
- the woven heat shield defines an air gap that extends between an inner surface of the woven heat shield and an outer surface of the fuel structure; and
- the woven heat shield weave pattern is configured to trap an insulating layer of stagnant air against the outer surface of the fuel structure.

16. The method of claim 15, wherein the woven heat shield includes gaps formed between the first set of strands and the second set of strands after the weave is tightened, and the gaps are permeable to air.

17. The method of claim 15, wherein the fuel structure is a fuel injector or a fuel manifold.

* * * * *